Oct. 15, 1968  E. J. PULRANG  3,405,514
MATERIAL DISPENSING APPARATUS
Filed Oct. 21, 1965  2 Sheets-Sheet 2
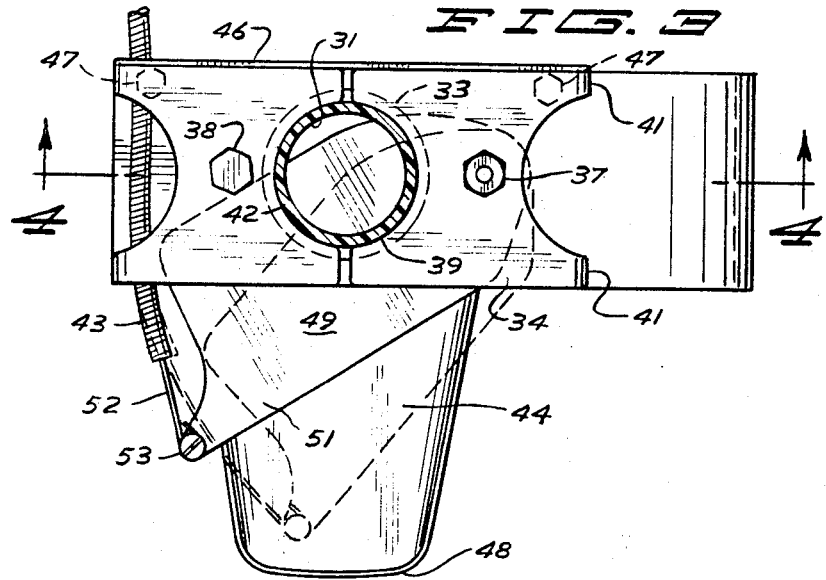
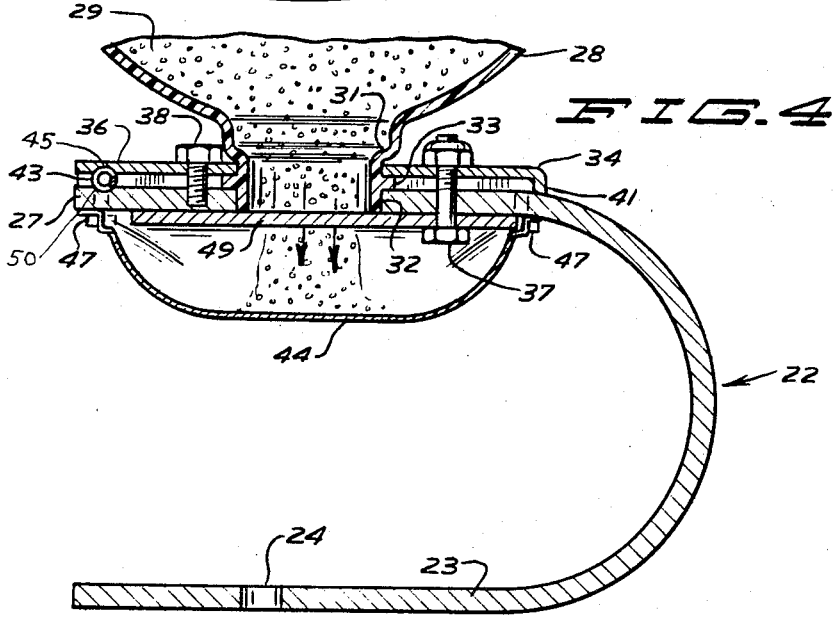
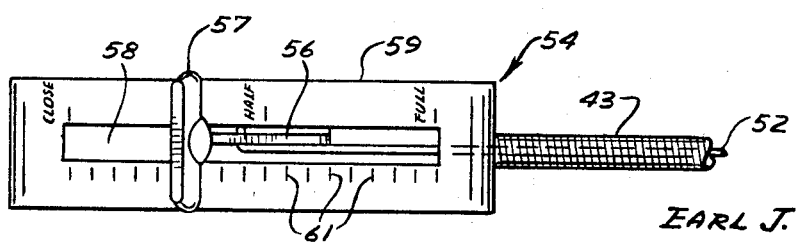
INVENTOR.
EARL J. PULRANG
BY
Braddock & Gurd
ATTORNEYS United States Patent Office 3,405,514
Patented Oct. 15, 1968

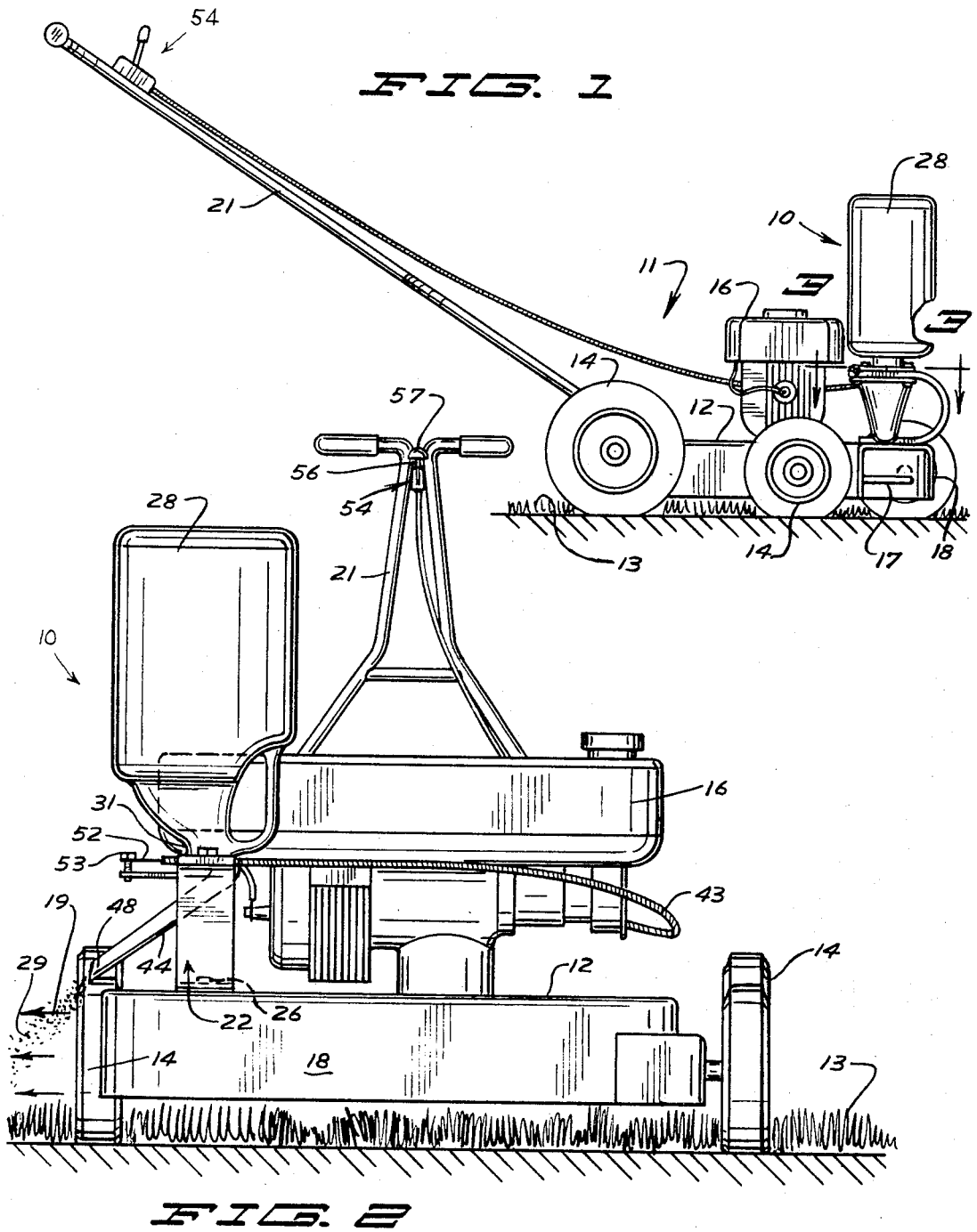

3,405,514
MATERIAL DISPENSING APPARATUS
Earl J. Pulrang, 6504 39th Ave. S.,
Seattle, Wash. 68118
Filed Oct. 21, 1965, Ser. No. 499,220
8 Claims. (Cl. 56—25.4)

ABSTRACT OF THE DISCLOSURE

A fertilizing dispensing apparatus mounted on a rotary lawn mower. The apparatus has an upright hopper attached to a U-shaped frame mounted on the lawn mower housing. The frame carries a valve which regulate the flow of fertilizer from the hopper into a downwardly inclined discharge trough which guides the fertilizer into the air stream moving away from the lawn mower housing.

Summary of the invention

This invention relates to a particulate material dispensing apparatus and more particularly to a material dispensing attachment used with a grass cutting machine for distributing particulate materials, such as fertilizers, lawn seeds, weed killers, insecticides, and the like, over the surface of the ground.

It is the object of the invention to provide an improved dispensing apparatus mountable on a lawn mower and operable in conjunction with vibrations of the mower to dispense a substantially continuous and even flow of particulate material into the air stream expelled from the lawn mower.

Another object of the invention is to provide a particulate material dispensing apparatus having a support attachable to the housing of a rotary lawn mower and a material guiding trough for directing a substantially continuous flow of particulate material into the air stream and cut grasses moving away from the lawn mower housing.

Still another object of the invention is to provide a dispensing apparatus with an adjustable valve for controlling the rate of flow of particulate material from a storage container onto an inclined trough used to direct the material into an air stream.

A further object of the invention is to provide a versatile and low cost apparatus capable of dispensing a variety of particulate materials having a size range from pellets to powder.

An additional object of the invention is to provide a dispensing apparatus which is easily mounted on the housing of a rotary lawn mower, has a minimum number of parts capable of being readily disassembled for maintenance and storage, and is reliable and efficient in operation.

Other objects and advantages of the invention are apparent upon reference to the following description and the accompanying drawing wherein:

FIGURE 1 is a side elevation view of a rotary lawn mower equipped with the material dispensing apparatus of this invention;

FIGURE 2 is an enlarged front view of the rotary mower and material dispensing apparatus shown in FIGURE 1;

FIGURE 3 is an enlarged sectional view taken along the line 3—3 of FIGURE 1;

FIGURE 4 is a sectional view taken along the line 4—4 of FIGURE 3; and

FIGURE 5 is an enlarged plan view of the control mechanism used to adjust the position of the adjustable valve for regulating the flow of material from the dispensing apparatus.

Referring to the drawing, there is shown in FIGURE 1 the dispensing apparatus of this invention indicated generally at 10 mounted on a conventional rotary lawn mower 11. The lawn mower 11 has a downwardly open housing 12 supported above the surface of a lawn 13 by wheel and axle assemblies 14 mounted on opposite sides of the housing. Mounted on top of the center portion of the housing is an internal combustion engine 16 drivably connected to a horizontal cutting blade 17 located within the housing. One side of the forward section of the housing has a discharge chute 18 laterally open to the inside of the housing providing a lateral passage for movement of air and grass clippings, indicated by arrows 19 in FIGURE 2, caused by rotation of the cutting blade 17. Extended upwardly and rearwardly from the housing is a handle 21 used to guide and push the mower over the lawn.

The dispensing apparatus 10 is an attachment used with the mower to spread particulate material on the lawn or ground surface. The dispensing apparatus 10 functions in conjunction with vibrations of the mower to discharge a uniform and substantially continuous flow of particulate material into the air stream established by the rotating cutting blade 17. The particulate material is directed into the top of the air stream adjacent the open end of the discharge chute 18 as shown in FIGURE 2. The particulate material may range in size from large pellets to powder and has substantially free flowing characteristics. Fertilizers, lawn seeds, weed killers, and insecticides are examples of materials which can be spread on a surface with dispensing apparatus 10.

As shown in FIGURE 4, the dispensing apparatus 10 has a U-shaped support indicated generally at 22 including a flat lower leg 23 formed with a transverse hole 24. The single bolt 26 shown in FIGURE 2 projects through the hole 24 and cooperates with a nut to secure the support to the top of the housing 12. Positioned above and substantially parallel to the lower leg 23 is a flat upper leg 27 supporting an upwardly directed hopper 28 used to store particulate material 29. The hopper 28 has an open top and a downwardly projected stepped neck 31 fitted into a vertical hole 32 in the upper leg 27. An annular rib 33 integral with and projected outwardly from the neck 31 cooperates with a clamp assembly to secure the hopper 28 to the support 22.

The clamp assembly comprises a pair of plates 34 and 36 positioned over the upper leg 27 and engageable with opposite arcuate portions of the rib 33 to releasably secure the hopper 28 to the support 22. Plate 34 is secured to the upper leg 27 by an upright nut and bolt assembly 37. As shown in FIGURE 3, plate 34 has a semicircular section 39 fitted around the neck 31 over slightly less than one-half the rib 33. The opposite end of the plate 34 has a pair of short downwardly projected legs 41 which bear against the upper leg 27. When the nut and bolt assembly 37 is tightened the plate 34 pivots about the legs 41 forcing the semicircular section 39 into engagement with the annular rib 33 thereby positively sandwiching the rib 33 between the plate 34 and the upper leg 27.

The opposite plate 36 is secured to the outer end portion of the leg 27 by a bolt 38 projected through a suitable hole through plate 34 and threaded into the upper leg 27. As shown in FIGURE 3, plate 36 has a semicircular section 42 abutting against slightly less than one-half of the hopper neck 31 and engaging the top of about one-half of the rib 33. The outer end of the plate 36 is positioned over a Bowden cable 43. To insure proper positioning of the Bowden cable plate 36 has a transverse groove 45 and the upper leg 27 has a corresponding transverse groove 50 accommodating opposite sectors of the Bowden cable 43.

When the bolt 38 is tightened plate 36 bears firmly against the rib 33 sandwiching the rib between the upper leg 27 and the plate 36. The opposite end of the plate 36 is forced downwardly onto the Bowden cable 43 clamping the cable 43 between the upper leg 27 and the plate 36.

Positioned below the leg 27 is a downwardly and outwardly projected trough-like member or U-shaped guide 44 for directing the particulate material discharged from the hopper 28 downwardly and outwardly into the air stream 19 moving from the housing chute 18. As shown in FIGURE 3, trough-like member 44 has an upwardly projected lip 46 bearing against the inner edge of the upper leg 27. A pair of bolts 47 project upwardly through opposite upper portions of the trough-like member 44 adjacent the lip 46 and are threaded into suitable bores in the upper leg 27 to secure member 44 to the upper leg 27. As shown in FIGURE 2, the trough-like member 44 projects downwardly from the upper leg 27 of the U-shaped support at an angle between 25 to 40 degrees with respect to the plane of the top of the housing 12 terminating in a discharge edge 48 positioned outwardly and above the open end of the housing discharge chute 18.

Referring to FIGURE 4, the particulate material 29 in the hopper 28 flows downwardly through the neck 31 and falls onto the inclined trough-like member 44. The flow of particulate material from the hopper 28 to the trough-like member 44 is controlled by a flat valve or gate 49 having at one end thereof a longitudinal arm 51 secured to a wire 52 of Bowden cable 43. Wire 52 is bent around a screw 53 threaded into the end section of the arm 51. The opposite end of the valve 49 has a hole accommodating the bolt 37 used to pivotally mount the valve 49 below the upper leg 27 for movement about a generally upright axis in a plane generally parallel to the plane of the upper leg 27.

As shown in FIGURE 2, the valve 49 has a midportion which moves relative to the discharge opening of the hopper neck 31 to change the outlet size of the opening. Pivotal movement of the valve 49 about bolt 37 as shown in full and broken lines will close and open the discharge opening and thereby regulate the flow of particulate material 29 from the hopper 28. The position of the valve 49 is regulated with the use of a control mechanism indicated generally at 54 in FIGURES 1 and 5. To permit convenient operation of the valve 49 the control mechanism is mounted on the upper end section of the mower handle 21. With the control mechanism 54 in this location the valve 49 can be moved to a closed position when it is desired to stop spreading material on the ground. The control mechanism 54 has a lever 56 carrying a cross-hand grip 57. The lever 56 projects through a slot 58 in a rectangular frame 59 having indicia 61 indicating the position of the lever relative to the frame. The lever 56 is connected to the Bowden cable below the frame 59 and wire 52 functions to move the wire 52 relative to the cable sheath pivoting the valve 49 about the bolt 37. The position of the valve 49 is coordinated with the position of the lever 56 relative to the indicia 61 so that the indicia 61 indicates the size of the material discharge opening of the hopper neck portion 31. As shown in FIGURE 5, the lever 56 is in a position wherein the valve closes about one-half of the opening in the neck 31.

In use, the dispensing apparatus is secured to the top of the mower housing 12 by a single bolt 26 mounting the lower leg 23 to the top of the housing. The support 22 is located on the housing 12 adjacent the discharge chute 18. The inclined trough-like member 44 extends downwardly in a lateral direction with the terminating discharge edge 48 located slightly above the stream of air and grass clippings moving from the discharge chute 18 of the housing. The Bowden cable 43 extends from the support 22 around the engine 16 and up along the handle 21 to the control mechanism 54.

To spread particulate material on the lawn the hopper is initially filled with the material with the valve 49 closed by pouring the material into the hopper through the open top. The scattering of the material onto the lawn is commenced after the engine has been started. The material is spread on the lawn during the cutting operation by merely opening the valve 49 to the desired amount. Movement of the control lever 56 causes valve 49 to pivot about the bolt 37 opening the lower or discharge end of the hopper neck 31. The particulate material flows through the neck 31 onto the downwardly inclined trough-like member 44. A positive flow of material downwardly along the trough-like member 44 is aided by the vibration of the engine and rotary blade along with the shocks and vibration resulting from the wheel assemblies rolling over the ground or lawn. These vibrations insure a substantially continuous and positive flow of particulate material from the hopper 28 downwardly along the inclined trough-like member 44 and into the stream of air and grass clippings 19 to provide a substantially even spreading distribution of particulate material over the lawn laterally of the lawn mower. The spreading of particulate material on the lawn can be terminated by merely closing the valve 49. This is accomplished by moving lever 56 to the closed position.

While there have been shown and described the invention as applied to a preferred embodiment it is understood that various omissions, substitutions, and changes in shape and details of the dispensing apparatus illustrated may be made by those skilled in the art without departing from the spirit of the invention. The invention is to be limited only as indicated by the scope of the following claims.

I claim:
1. A material dispensing apparatus used with a rotary lawn mower having a handle and a housing including a discharge chute for directing air and cut material laterally from the housing comprising:
  (a) a U-shaped support having a lower leg secured to said housing and an upper leg positioned substantially horizontally above the housing, said upper leg having an upright hole,
  (b) an upright hopper for storing particulate material to be spread on the ground, said hopper having a downwardly directed neck formed with a discharge opening, the end portion of said neck projected into the upright hole in the upper leg,
  (c) clamp means for securing the hopper to said upper leg maintaining the end portion of the neck in said hole,
  (d) valve means pivotally mounted on said upper leg and movable to open and closed positions relative to said discharge opening,
  (e) control means pivotally moving the valve means to open and closed positions, said control means including a control mechanism mounted on the upper portion of the lawn mower handle, and
  (f) trough-like means secured to said upper leg and projected downwardly and outwardly therefrom in a lateral direction, said trough-like means having a discharge edge located above and laterally outwardly from the housing adjacent the open end of the discharge chute whereby material flowing through the discharge opening in the hopper neck moves along the trough-like means and is directed thereby into the air moving from the housing carrying the material laterally of the housing and spreading the material on the ground.

2. The material dispensing apparatus of claim 1 wherein said control means includes:
  (a) a Bowden cable having a wire attached to the valve means and the control mechanism, a portion of the Bowden cable being secured to the upper leg by the clamp means.

3. A dispensing apparatus used with a rotary lawn mower having a housing including a discharge chute for directing air and cut material laterally from the housing comprising:

(e) a support secured to said housing, said support having an upper leg positioned above the housing, (b) an upright hopper for storing particulate materials to be spread on the ground, said hopper having a downwardly directed neck formed with a discharge opening, the end portion of said neck projected into the upright hole in the upper leg, (c) means for securing the hopper to said upper leg maintaining the end portion of the neck in said hole, and (d) trough-like means secured to said upper leg and projected downwardly and outwardly therefrom in a lateral direction, said trough-like means having a discharge edge located laterally outward from the housing adjacent the open end of the discharge chute whereby material flowing through the discharge opening in the hopper neck moves along the trough-like means and is directed thereby into the air moving from the housing carrying the material laterally of the housing and spreading the material on the ground.

4. A dispensing apparatus used with a rotary lawn mower having a housing including a discharge chute for directing air and cut material laterally from the housing comprising:

(a) a support secured to said housing, said support having an upper leg positioned above the housing, (b) an upright hopper for storing particulate materials to be spread on the ground, said hopper having a downwardly directed neck formed with a discharge opening, (c) means for securing the hopper to said upper leg, and (d) trough-like means secured to said upper leg and projected downwardly and outwardly therefrom in a lateral direction, said trough-like means having a discharge edge located laterally outward from the housing adjacent the open end of the discharge chute whereby material flowing through the discharge opening in the hopper neck moves along the trough-like means and is directed thereby into the air moving from the housing carrying the material laterally of the housing and spreading the material on the ground.

5 A material dispensing apparatus usable with a rotary cutting machine having a housing and a discharge chute for directing air from the housing comprising:

(a) a support securable to said housing, said support having a member positioned directly above the housing, (b) a hopper for storing material secured to said support, said hopper having a downwardly directed discharge opening, means securing the hopper to the member locating the discharge opening above the housing, (c) guide means secured to the member below said hopper discharge opening, said guide means extended in a downward and outward direction terminating in a discharge edge located adjacent the open end of the chute whereby material flowing through the discharge opening in the hopper moves along the guide means and is directed thereby into the air moving from the discharge chute carrying the material away from the chute and spreading the material on the ground.

6. The material dispensing apparatus defined in claim 5 including:

(a) valve means movably mounted on said support for controlling the rate of flow of material discharged from the hopper onto the guide means.

7. A material dispensing apparatus usable with a rotary cutting machine having a housing and a discharge chute for directing air from the housing comprising:

(a) a support securable to said housing, said support having a member positioned above the housing, said member having an upright hole, (b) an upright hopper for storing particulate material, said hopper having a downwardly directed neck formed with an outwardly directed rib and a discharge opening, said neck projecting into the hole in the member, (c) a clamp assembly comprising a pair of plates engageable with opposite sectors of said rib and means to clamp said rib between said plates and said member to secure the hopper to the support member, and (d) chute means secured to said support member below said hopper discharge opening, said chute means projected in a downwardly direction terminating in a discharge edge located adjacent the open end of the housing chute for directing particulate material flowing from the hopper into the air moving from the housing discharge chute.

8. The apparatus defined in claim 7 including:

(a) valve means pivotally mounted on said member of the support and movable to a first position to close said discharge opening of the hopper and movable from the first position to open the discharge openings increasing amounts so as to regulate the flow of material from the hopper onto the downwardly inclined chute.

References Cited

UNITED STATES PATENTS

| | | | |
|---|---|---|---|
| 2,847,224 | 8/1956 | Stout | 239—665 |
| 2,861,611 | 11/1958 | Considder | 146—124 |
| 2,878,633 | 3/1959 | Mullin | 56—25.4 |
| 2,966,023 | 12/1960 | Carpenter | 56—25.4 |
| 2,974,963 | 3/1961 | McBride | 275—2 |
| 3,359,710 | 12/1967 | Anderson | 56—25.4 |

ROBERT E. BAGWILL, *Primary Examiner.*